US006850041B2

(12) United States Patent
Takano

(10) Patent No.: US 6,850,041 B2
(45) Date of Patent: Feb. 1, 2005

(54) BATTERY PACK USED AS POWER SOURCE FOR PORTABLE DEVICE

(75) Inventor: Nobuhiro Takano, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 12 days.

(21) Appl. No.: 10/301,869

(22) Filed: Nov. 22, 2002

(65) Prior Publication Data

US 2003/0151393 A1 Aug. 14, 2003

(30) Foreign Application Priority Data

Nov. 22, 2001 (JP) ..................................... P2001-358247

(51) Int. Cl.[7] ................................................. H02J 7/04
(52) U.S. Cl. ..................................................... 320/150
(58) Field of Search ................................ 320/150, 132, 320/110, 114, 115; 307/80, 126, 150; 324/429, 430–435; 702/63; 713/340

(56) References Cited

U.S. PATENT DOCUMENTS 5,442,794 A * 8/1995 Wisor et al. ................ 713/340
5,889,382 A * 3/1999 Jung .......................... 320/106
6,384,577 B1 * 5/2002 Kikuchi et al. ............. 320/134
6,448,743 B2 * 9/2002 Sano et al. .................. 320/162
6,683,439 B2 * 1/2004 Takano et al. .............. 320/132

FOREIGN PATENT DOCUMENTS

| DE | 197 29 009 A1 | 2/1998 |
| DE | 198 47 988 A1 | 4/2000 |
| EP | 0 656 578 B1 | 2/2000 |

* cited by examiner

*Primary Examiner*—Pia Tibbits
(74) *Attorney, Agent, or Firm*—Sughrue Mion, PLLC

(57) ABSTRACT

A battery pack includes a simple circuitry that improves the life cycle characteristic of the battery. The battery pack includes a plurality of cells connected in series. One of the cells is a lower rated capacity cell having a smaller capacity than the other cells. The lower rated capacity cell is disposed in a first tier of the plurality of cells from a negative terminal of the battery. Temperature and voltage of the lower rated capacity cell are detected to determine whether the lower rated capacity cell has reached the fully charged condition. When the fully charged condition is detected, charging of the battery is stopped. Similarly, based on the temperature and voltage detected, whether the lower rated capacity cell will soon be over-discharged is determined. If so, the use of the battery is stopped.

13 Claims, 6 Drawing Sheets

BATTERY PACK USED AS POWER SOURCE FOR PORTABLE DEVICE

BACKGROUND OF THE INVENTION

1. Field of the Invention

The present Invention relates to a battery pack including a chargeable battery, such as a nickel-cadmium battery, a nickel-hydrogen battery, or a lithium-ion battery, used as the power source for a portable power tool.

2. Description of the Related Art

Recently, secondary batteries, such as nickel-cadmium batteries, nickel-hydrogen batteries, and lithium-ion batteries, have increased their capacity and greatly improved charge/discharge performance when charged and discharged with large current. These high-performance secondary batteries are used as the power source of high-load machines, such as cordless power tools (referred to as simply "power tools" hereinafter). Secondary batteries used in power tools are normally in the form of a battery pack that includes a battery made from battery cells connected in series by, for example, a connection plate and used as the power source for high-load devices, enabling the high-load devices to be cordless. A high-performance chargeable battery can generate a great deal of heat because it discharges large currents and is also charged using large currents. This heat can reduce the life of the battery. Also, when the battery is made from a number of cells connected in series, the lower rated capacity cells in the battery can easily become overcharged or over-discharged. When the lower rated capacity cells are repeatedly overcharged and over-discharged, the life of only the lower rated capacity cells is shortened.

The charging characteristic of a battery will be described with reference to FIG. 1. As shown in FIG. 1, the voltage V, temperature T, and internal pressure P of the battery gradually increase from start of charge until the battery is almost fully charged. However, when the battery is almost fully charged at time F, the voltage V, temperature T, and internal pressure P of the battery rapidly increase. With this feature in mind, whether or not the battery is fully charged is determined by detecting the rapid change in the battery's voltage V and temperature T when the battery is near full charge. If charging of the battery continues beyond the full charge time F, then the battery becomes overcharged in region O.

FIG. 2 shows a charging characteristic of lower rated capacity cells. As shown in FIG. 2, the voltage $V_L$, temperature $T_L$, and internal pressure $P_L$ of the lower rated capacity cells gradually increase from start of charge similar to the curves shown in FIG. 1. However, the lower rated capacity cells of the battery become fully charged at a time $F_L$, which is earlier than when the other cells become fully charged. As a result, the charge condition of the lower rated capacity cells has already entered the overcharged region O before the battery is detected to be fully charged at time F. Because the lower rated capacity cell is further charged after its charged condition enters the overcharged region, temperature $T_L$ and internal pressure $P_L$ of the lower rated capacity cell increases to the point where the lower rated capacity cell deteriorates. When the battery is repeatedly discharged and charged, the lower rated capacity cell is repeatedly overcharged and over-discharged. The lower rated capacity cell can leak electrolyte as a result. Internal impedance can also increases. In association with this, the capacity of the lower rated capacity cell rapidly decreases, potentially leading to an internal short circuit or disconnection. These can shorten the life of the battery pack.

FIG. 3 shows the cycle life of a chargeable battery in two situations A, B. In situation A the battery is repeatedly discharged 100% and charged to 100% of its capacity. In situation B, the battery is discharged 80% and charged to 80%. That is, in situation B discharge is stopped before the battery is fully discharged, that is, when the battery is only 80% discharged, and charging is stopped before a full charge is achieved, that is, when the battery has been charged to only 80% of its capacity. As described above, the battery's life is much shorter in situation A when the battery is discharged and charged 100% than in situation B when discharged and charged only partially.

In order to increase the life of batteries used in, for example, hybrid electric vehicles (HEV), the partial discharge and charge method shown in FIG. 3 is implemented to prevent the batteries from over-discharging and overcharging.

However, in order to implement the partial discharge and charge method, the battery voltage and temperature of all of the cells in the battery, or of a number of cell groups in the battery, need to be monitored. This requires complicated control circuitry. A battery pack that includes such complicated circuitry is too expensive for incorporation into products for every day use.

SUMMARY OF THE INVENTION

In view of the foregoing, it is an object of the present invention to overcome the above-described problems and provide a battery pack including simple circuitry that improves the life cycle characteristic of the battery.

In order to achieve the above and other objects, there is provided, according to one aspect of the invention, a battery pack including a battery, full charge judgement means, and control means. The battery pack is used as a power source for a portable device and chargeable by a charging unit. Thus, the battery incorporated in the battery pack is selectively connected to the portable device and the charging unit. The battery according to the invention includes a plurality of cells connected in series in which at least one cell is a lower rated capacity cell having a smaller capacity than the other cells. The full charge judgment means is provided for judging whether the lower rated capacity cell is fully charged. When the full charge judgment means judges that the lower rated capacity cell is fully charged, the control means instructs the full charge judgement means to stop charging the battery.

Because the battery pack includes a plurality of cells connected in series and one of the cells is a lower rated capacity cell with a lower rated capacity than the other cells, the lower rated capacity cell will be the first to fully charge when the battery is connected to the charging unit. If charging is continued after this, then the lower rated capacity cell will enter an overcharged condition. However, when it is judged that the lower rated capacity cell has reached a fully charged condition, then charge of the battery is stopped so that overcharge of the lower rated capacity cell can be prevented. Shortening of the life cycle of the lower rated capacity cell can thus be prevented, so that the life cycle of the battery can be increased.

The full charge judgment means may include a cell temperature detector for detecting a temperature of the lower rated capacity cell, and a cell voltage detector for detecting a voltage of the lower rated capacity cell. The cell temperature detector outputs a cell temperature signal indicative of the temperature of the lower rated capacity cell. The cell voltage detector outputs a cell voltage signal indicative of the voltage of the lower rated capacity cell. The full charge judgment means judges whether the lower rated capacity cell is fully charged based on the cell temperature signal and the cell voltage signal.

Normally, when charge of a chargeable battery continues over a period of time, the voltage and the temperature of the battery increases. According to the present invention, whether the lower rated capacity cell is fully charged is judged based on the voltage and temperature of the lower rated capacity cell. This judgment can be performed based on only one of the voltage and the temperature.

A battery voltage detector and abnormal battery charge condition detection means may further be provided. The battery voltage detector is provided for detecting a voltage of the battery and outputting a battery voltage signal indicative of the voltage of the battery. The abnormal battery charge condition detection means is provided for detecting an abnormal battery charge condition occurring in the battery during charging of the battery based on the battery voltage signal. The control means instructs the full charge judgement means to stop charging the battery when the abnormal battery charge condition detection means detects the abnormal charge condition.

Normally an abnormal condition, such as an overcharged condition, that occurs in a battery with a lower rated capacity cell, which has a lower rated capacity than the other cells of the battery, is caused by the lower rated capacity cell. However, there will be situations where the abnormal condition is not caused by the lower rated capacity cell. Therefore, this aspect of the present invention observes the voltage of the entire battery, rather than just the voltage of the lower rated capacity cell. For example, if during charge the full charge judgment means does not judge that the lower rated capacity cell is fully charged even though the battery is judged to be fully charged, it will be determined that an abnormal condition exists in the battery so that operations for charging the battery are stopped.

According to another aspect of the invention, there is provided a battery pack including a battery, abnormal cell discharge condition detection means, and control means. The abnormal cell discharge condition detection means is provided for detecting an abnormal cell discharge condition occurring in the lower rated capacity cell during discharging of the lower rated capacity cell. The control means instructs the portable device to stop driving the portable device when the abnormal cell discharge condition detection means detects the abnormal cell discharge condition.

Because the battery includes a plurality of cells connected in series and at least one of the cells is a lower rated capacity cell with a lower rated capacity than the other cells, when the battery pack is used as the power source of a portable device, the lower rated capacity cell will be the first of the cells run down even if the other cells are still charged to a certain extent. If discharge continues after this, then the lower rated capacity cell will enter an overcharged condition. However, because in the invention, drive of the portable device is stopped when an abnormal condition of the lower rated capacity cell is detected, over-discharge of the lower rated capacity cell can be prevented. Shortening of the life of the lower rated capacity cell can thus be prevented, and consequently the life cycle of the battery can be increased.

The abnormal cell discharge condition detection means may include a cell temperature detector for detecting a temperature of the lower rated capacity cell, and a cell voltage detector for detecting a voltage of the lower rated capacity cell. The cell temperature detector outputs a cell temperature signal indicative of the temperature of the lower rated capacity cell, and the cell voltage detector outputs a cell voltage signal indicative of the voltage of the lower rated capacity cell. The abnormal cell discharge condition detection means judges whether the lower rated capacity cell is in the abnormal cell discharge condition based on at least one of the cell temperature signal and the cell voltage signal.

When the battery pack is used as the power source for a portable device, then abnormal cell discharge condition is detected, so that the lower rated capacity cell does not become over-discharged, by paying attention to at least one of the voltage and temperature of the lower rated capacity cell.

Preferably, a battery voltage detector and abnormal battery discharge condition detector may further be provided. The battery voltage detector is provided for detecting a voltage of the battery and outputs a battery voltage signal indicative of the voltage of the battery. The abnormal battery discharge condition detection means is provided for detecting an abnormal battery discharge condition occurring in the battery during discharging of the battery based on the battery voltage signal. The control means instructs the portable device to stop driving the portable device when the abnormal battery discharge condition detection means detects the abnormal discharge condition.

Normally an abnormal condition, such as an over-discharged condition, that occurs in a battery with a lower rated capacity cell, is caused by the lower rated capacity cell. However, there will be situations where such abnormal condition is not caused by the lower rated capacity cell. Therefore, the invention detects abnormal discharge condition in the battery itself, and not just abnormal conditions during discharge of the lower rated capacity cell. For example, the control means stops drive of the portable device when the stop drive function does not operate even though the voltage of the battery drops to a fixed level or lower during discharge.

Full charge judgment means may further be provided for judging whether the lower rated capacity cell is fully charged. In this case, the control means instructs the full charge judgement means to stop charging the battery when the full charge judgment means judges that the lower rated capacity cell is fully charged.

By further providing the full charge judgment means, charge of the battery can be stopped when it is judged that the lower rated capacity cell is fully charged. As a result, an overcharged condition of the lower rated capacity cell can be prevented in addition to abnormal conditions during discharge, such as over-discharge.

A charge/discharge detection unit may further be provided for detecting whether the battery is presently charging or discharging. Accordingly, when it is judged that the battery is charging, then the full charge judgment means judges whether the lower rated capacity cell is fully charged. When it is judged that the battery is discharging, then the abnormal discharge condition detection means will detect whether or not the lower rated capacity cell is in an abnormal condition. The charge/discharge detection unit can be made from a simple hardware configuration. Also, the various judgments made by the control means based on the output from the charge/discharge detection unit can be easily realized by software.

Preferably, the lower rated capacity cell is disposed in a first tier of the plurality of cells from a negative terminal of the battery. With this configuration, the voltage of the lower rated capacity cell can be detected using a simple configuration.

BRIEF DESCRIPTION OF THE DRAWINGS

The above and other objects, features and advantages of the invention will become more apparent from reading the following description of the embodiment taken in connection with the accompanying drawings in which.

DETAILED DESCRIPTION OF THE EMBODIMENT

Figure 4:
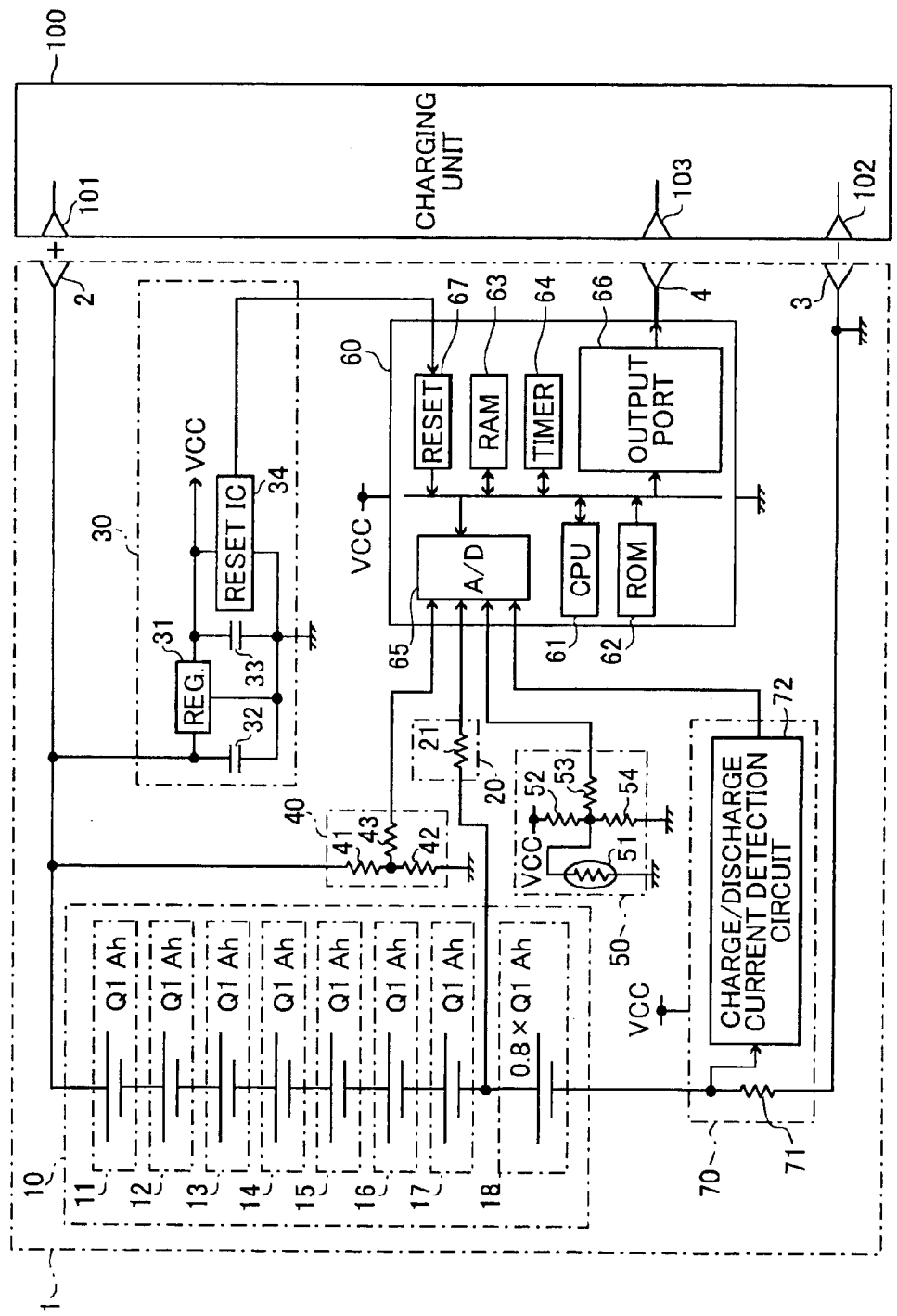
FIG. 4 is a circuit diagram showing a battery pack connected to a charging unit.
Figure 5:
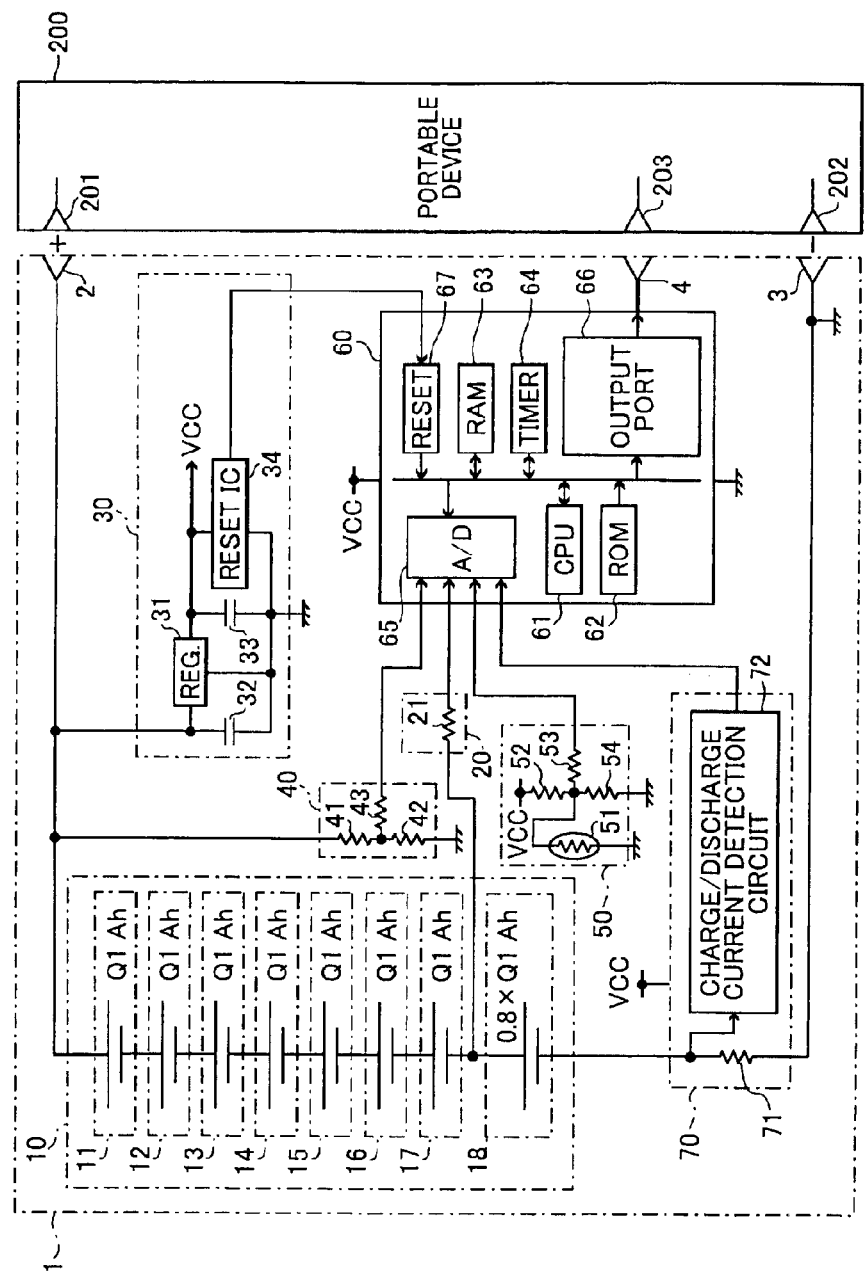
FIG. 5 is a circuit diagram showing the battery pack connected to a portable device.

Next, a battery pack according to an embodiment of the present invention will be described while referring to FIGS. 4 to 6. FIG. 4 is a circuit diagram showing a battery pack 1 connected to a charging unit 100. FIG. 5 is a circuit diagram showing the battery pack 1 connected to a portable device 200.

As shown in FIG. 4, the battery pack 1 includes a positive terminal 2, a negative terminal 3, a battery 10, a cell voltage detector 20, a constant voltage power source 30, a battery voltage detector 40, a battery temperature detector 50, a microcomputer 60, and a charge/discharge detector 70. The charging unit 100 includes a positive terminal 101, a negative terminal 102, and an information transmission terminal 103. Although not shown in the drawings, the charging unit 100 is connected to a 100V AC power source.

When the battery pack 1 is connected to the charging unit 100, the positive terminal 2 of the battery pack 1 is connected to the positive terminal 101 of the charging unit 100 and the negative terminal 3 of the battery pack 1 is connected to the negative terminal 102 of the charging unit 100. An output port 66 of a microcomputer 60 is connected to the information transmission terminal 103 of the charging unit 100 through an information transmission terminal 4 of the battery pack 1, so that the microcomputer 60 can send signals, such as a stop charge signal, to the charging unit 100.

As shown in FIG. 5, the portable device 200 includes a positive terminal 201, a negative terminal 202, and an information transmission terminal 203. When the battery pack 1 is connected to the portable device 200, the output port 66 is connected to the information transmission terminal 203 of the portable device 200 through the information transmission terminal 4 of the battery pack 1, so that the microcomputer 60 can send signals, such as a stop charge signal, to the portable device 200.

The battery 10 includes cells 11 to 18 connected in series together by a connection plate. The cells 11 to 17 have a rated capacity of Q1Ah. On the other hand, the cell 18 has a rated capacity of 0.8×Q1Ah, which is 20% less than the capacity of the cells 11 to 17. The cell 18 will be referred to as the "lower rated capacity cell 18" hereinafter. The lower rated capacity cell 18 is disposed at the first step in the battery 10, counting from the negative terminal 3, which is the ground terminal.

As shown in FIG. 4, when the battery pack 1 is connected to the charging unit 100 and in the process of being charged, charge current flows from the positive terminal 101 of the charging unit 100 to the positive terminal of the battery pack 10 and from the negative terminal of the battery pack 10 to the negative terminal 102 of the charging unit 100. On the other hand, as shown in FIG. 5, when the battery pack 1 is connected to the portable device 200 and used as the power source for driving the portable device 200, then a load current flows from the positive terminal 2 of the battery pack 1 through the portable device 200 to the negative terminal 3 of the battery pack 1.

The cell voltage detector 20, the constant voltage power source 30, the battery voltage detector 40, the battery temperature detector 50, the microcomputer 60 are connected to this current path and to the microcomputer 60.

The microcomputer 60 includes a central processing unit (CPU) 61, a read-only memory (ROM) 62, a random access memory (RAM) 63, a timer 64, a digital-to-analog (A/D) converter 65, an output port 66, and a reset input port 67. The components of the microcomputer 60 are connected to each other through an internal bus.

The cell voltage detector 20 includes only a single resistor 21. The resistor 21 is connected between the A/D converter 65 and a metal plate that connects the cells 17, 18. The resistor 21 is a voltage limiting resistor. Through the resistor 21, a voltage of the lower rated capacity cell 18 is applied to the A/D converter 65.

Because the lower rated capacity cell 18 is the first cell (step) counting from the negative (ground) terminal, the voltage of the lower rated capacity cell 18 can be detected by such a simple circuit including only the single resistor 21. If the lower rated capacity cell 18 were not the first cell counting from the negative (ground) terminal, for example, if the positions of the cells 17 and 18 were switched, then more complicated voltage detection circuitry, such as a subtraction circuit, would be required to detect only the voltage of the lower rated capacity cell 18 because of the relationship of the lower rated capacity cell 18 with ground.

The constant voltage power source 30 includes a three-terminal regulator (REG) 31, smoothing capacitors 32, 33, and a reset IC 34. The constant voltage power source 30 outputs a constant voltage $V_{CC}$ that serves as the power source for the battery temperature detector 50, microcomputer 60, and the charge/discharge detector 70. The reset IC 34 is connected to the reset input port 67 of the microcomputer 60, and outputs a reset signal for initializing the microcomputer 60 to the reset input port 67.

The battery voltage detector 40 includes resistors 41 to 43 and is for detecting battery voltage of the entire battery 10. The resistors 41, 42 are connected in series between the positive terminal of the battery 10 and ground and are connected, through the resistor 43, to the A/D converter 65 of the microcomputer 60. The A/D converter 65 outputs a digital value that corresponds to the voltage detected at the battery voltage detector 40. The CPU 61 of the microcomputer 60 compares the digital value with a predetermined voltage stored in the ROM 62 to monitor whether the battery 10 is maintaining a proper voltage level.

The battery temperature detector 50 is positioned next to the lower rated capacity cell 18 and is for detecting temperature of the lower rated capacity cell 18. The battery temperature detector 50 includes a thermistor 51, which serves as a temperature sensing element, and resistors 52 to 54. The thermistor 51 is connected to the A/D converter 65 through the resistor 53. The A/D converter 65 outputs a digital value that corresponds to the battery temperature detected at battery temperature detector 50. The CPU 61 compares the digital value with a preset value to judge whether the temperature of the lower rated capacity cell 18 is' abnormally high.

The charge/discharge detector 70 includes a current detection resistor 71 and a charge/discharge current detection circuit 72 and detects whether the battery 10 is presently being charged or discharging. The charge/discharge current detection circuit 72 can be configured from both an inverting amplifier circuit and a non-inverting amplifier circuit. The electric potential developed at the current detection resistor 71 depends on the direction and magnitude of the current. When the inverting amplifier circuit and the non-inverting amplifier circuit invertingly amplify and non-invertingly amplify the electric potential, an output will generated by only one of the inverting amplifier circuit and the non-inverting amplifier circuit depending on whether the battery 10 is being charged or discharging. The A/D converter 65 of the microcomputer 60 performs an A/D conversion on the output, and the CPU 61 makes a judgment about whether the battery 10 is being charged or discharging.

Next, operation of the battery pack 1 will be described with reference to FIGS. 4 to 6.

Figure 6:
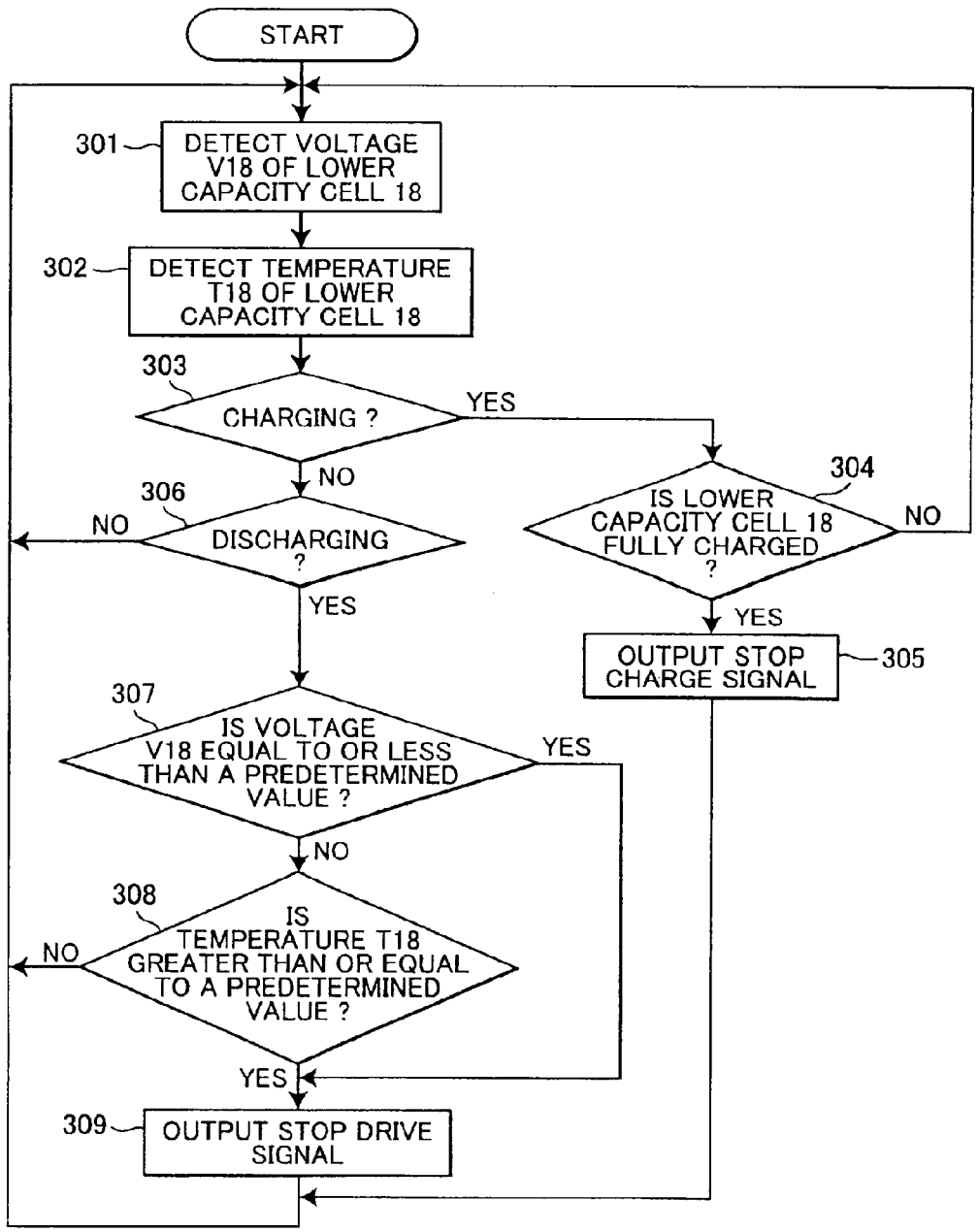
FIG. 6 is a flowchart representing operations performed by the battery pack.

When the program represented by the flowchart of FIG. 6 starts, then the A/D converter 65 of the microcomputer 60 converts output from the cell voltage detector 20 into a digital signal and the CPU 61 reads the digital signal as the voltage V18 of the lower rated capacity cell 18 (S301). In a similar manner, the A/D converter 65 of the microcomputer 60 converts output from the battery temperature detector 50 into a digital signal and the CPU 61 reads the digital signal as the temperature T18 of the lower rated capacity cell 18 (S302). Next, the A/D converter 65 converts output from the charge/discharge detector 70 into a digital signal that the CPU 61 uses to judge whether the battery pack 1 is presently being charged or not (S303). When it is judged that the battery pack 1 is being charged (S303:YES), then it is judged whether the lower rated capacity cell 18 is fully charged (S304).

Figure 1:
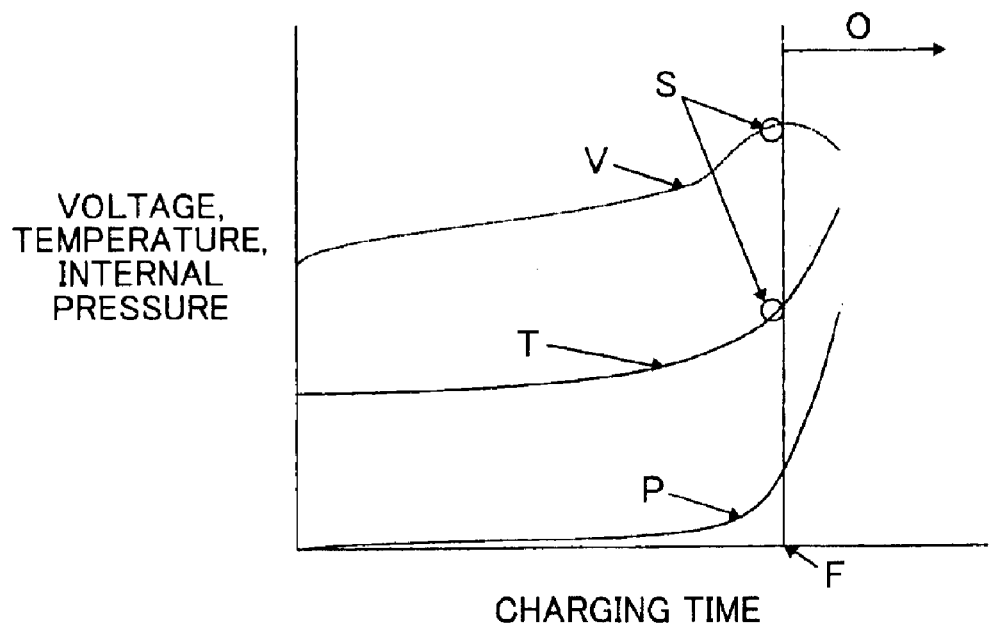
FIG. 1 is a graph representing charge characteristic of a chargeable battery.
Figure 2:
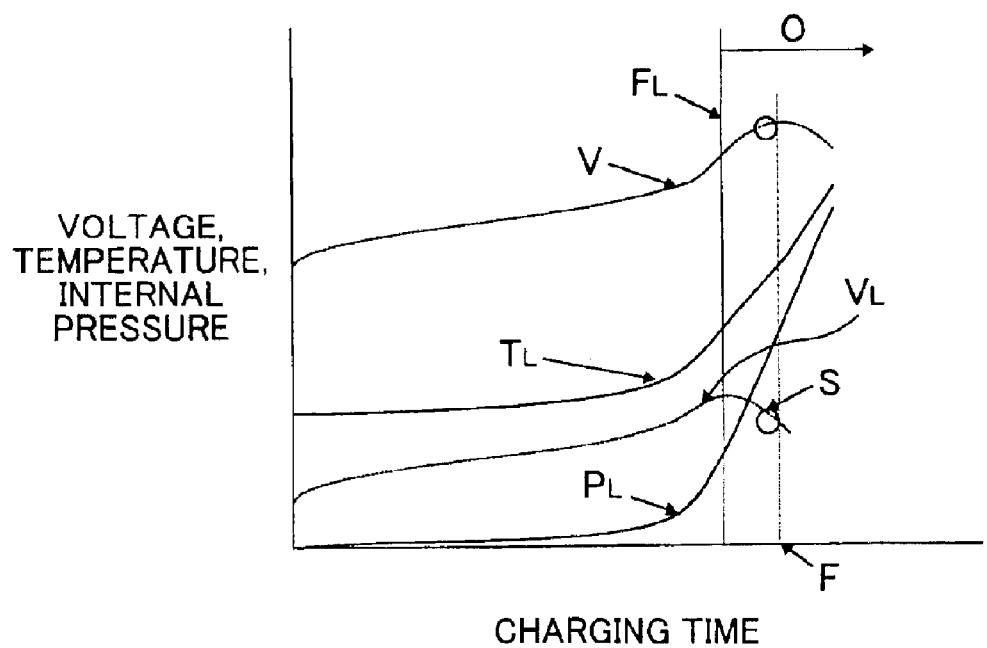
FIG. 2 is a graph representing charge characteristic of a lower rated capacity cell of a battery.
Figure 3:
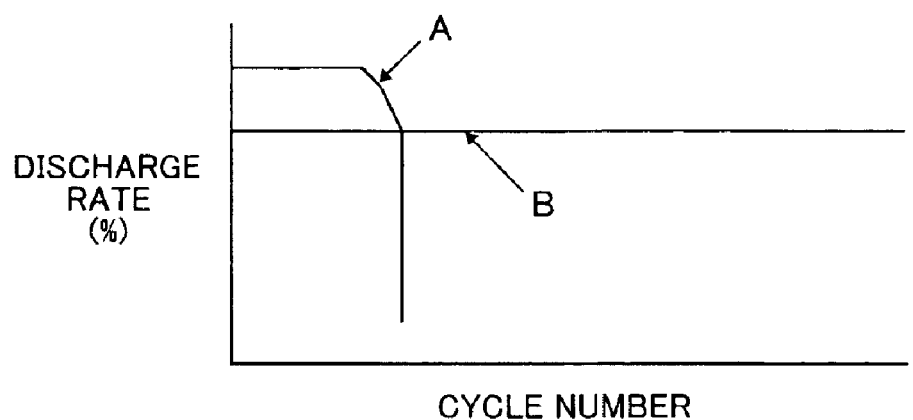
FIG. 3 is a graph representing cycle life of a battery when fully charged and discharged and when partially charged and discharged.

The judgment of whether or not the lower rated capacity cell 18 is fully charged is made according to the charging characteristic of the lower rated capacity cell shown in FIG. 2 and based on changes in the voltage V18 detected in S301 and the temperature T18 detected in S302. When it is judged that the lower rated capacity cell 18 is not fully charged (S304:NO), then the program returns to S301. On the other hand, when it is judged that the lower rated capacity cell 18 is fully charged (S304:YES), then a stop charge signal for stopping the charging operation of the charging unit 100 is output from the output port 66 of the microcomputer 60 (S305). The stop charge signal is input from the information transmission terminal 4 of the battery pack 1 into the information transmission terminal 103 of the charging unit 100, and the charging unit 100 stops output of its charge voltage accordingly.

If it is judged that the battery pack 1 is not presently being charged (S303:NO), then the A/D converter 65 converts output of the charge/discharge detector 70 into a digital signal that the CPU 61 uses to judge whether the battery pack 1 is presently discharging or not (S306). When it is judged that the battery pack 1 is presently discharging (S306:YES), then it is judged whether or not the lower rated capacity cell 18 has discharged to the point where its voltage V18 is equal to or less than a predetermined voltage value (S307). The judgment of S307 is for insuring that the lower rated capacity cell 18 does not over-discharge. Therefore, the predetermined voltage value should be set so that the lower rated capacity cell 18 will not have reached an over-discharged even when the voltage V18 is judged to be equal to or less than the predetermined voltage value.

For example, when the lower rated capacity cell 18 is a nickel-cadmium or nickel-hydrogen cell, then the predetermined voltage value is set to about 1.0V. When the lower rated capacity cell 18 is a 3.6V lithium-ion cell, then the predetermined voltage value is set to about 2.5V.

If it is judged that the voltage V18 of the lower rated capacity cell 18 is not equal to or less than the predetermined voltage value (S307:NO), then it is judged whether or not the temperature T18 of the lower rated capacity cell 18 is greater than or equal to a predetermined temperature value (S308). This judgment about the temperature of the lower rated capacity cell 18 during discharge is performed before the temperature of the lower rated capacity cell 18 starts rising to an abnormally high temperature. Therefore, discharge will be stopped when the temperature T18 exceeds the predetermined temperature value, even if the lower rated capacity cell 18' has not started rising to an abnormally high temperature. When it is judged that the temperature T18 of the lower rated capacity cell 18 has not increased to greater than or equal to the predetermined temperature value (S308:NO), then the program returns to S301. If the temperature T18 of the lower rated capacity cell 18 has risen to greater than or equal to the predetermined temperature value (S308:YES), then a stop drive signal for stopping drive of the portable device 200 is output from the output port 66 of the microcomputer 60 (S309).

The stop drive signal is applied from the information transmission terminal 4 of the battery pack 1 to the information transmission terminal 203 of the portable device 200 and stops drive of the portable device 200 by, for example, switching OFF the portable device 200. It should be noted that when the voltage V18 of the lower rated capacity cell 18 is judged to be equal to or less than the predetermined voltage value (S307:YES), then the program jumps past S308 to the process of S309 to shut OFF the portable device 200.

Because the lower rated capacity cell 18 is provided on purpose with a lower rated capacity than the other cells 11 to 17, the lower rated capacity cell 18 will always become fully charged before the other cells 11 to 17. Therefore, the judgment in S304 about whether the lower rated capacity cell 18 is fully charged will insure that the other cells 11–17 are always less than fully charged. Care need only be taken that the lower rated capacity cell 18 is not overcharged. For example, the judgment about whether the lower rated capacity cell 18 is fully charged can be made before the internal pressure $P_L$ of the lower rated capacity cell 18 starts to rapidly increase as shown in FIG. 2. This will insure that the battery 10 is never fully charged.

Similarly, the lower rated capacity cell 18 has a smaller charging capacity than the other cells 11 to 17. Therefore, the lower rated capacity cell 18 will always empty before the other cells 11 to 17. The judgment about the voltage of the lower rated capacity cell 18 during discharge insures that the cells 11 to 17 will never be fully discharged. Care need only be taken that the lower rated capacity cell 18 is not over-discharged.

The embodiment describes the rated capacity of the lower rated capacity call 18 as being 80% of the rated capacity of the cells 11 to 17. However, the present invention is not limited to this. The capacity of the lower rated capacity cell 18 need only be set lower than the capacity of the other cells so a degree satisfactory considering capacity tolerances set for the manufacture of the cells.

Figure 7:
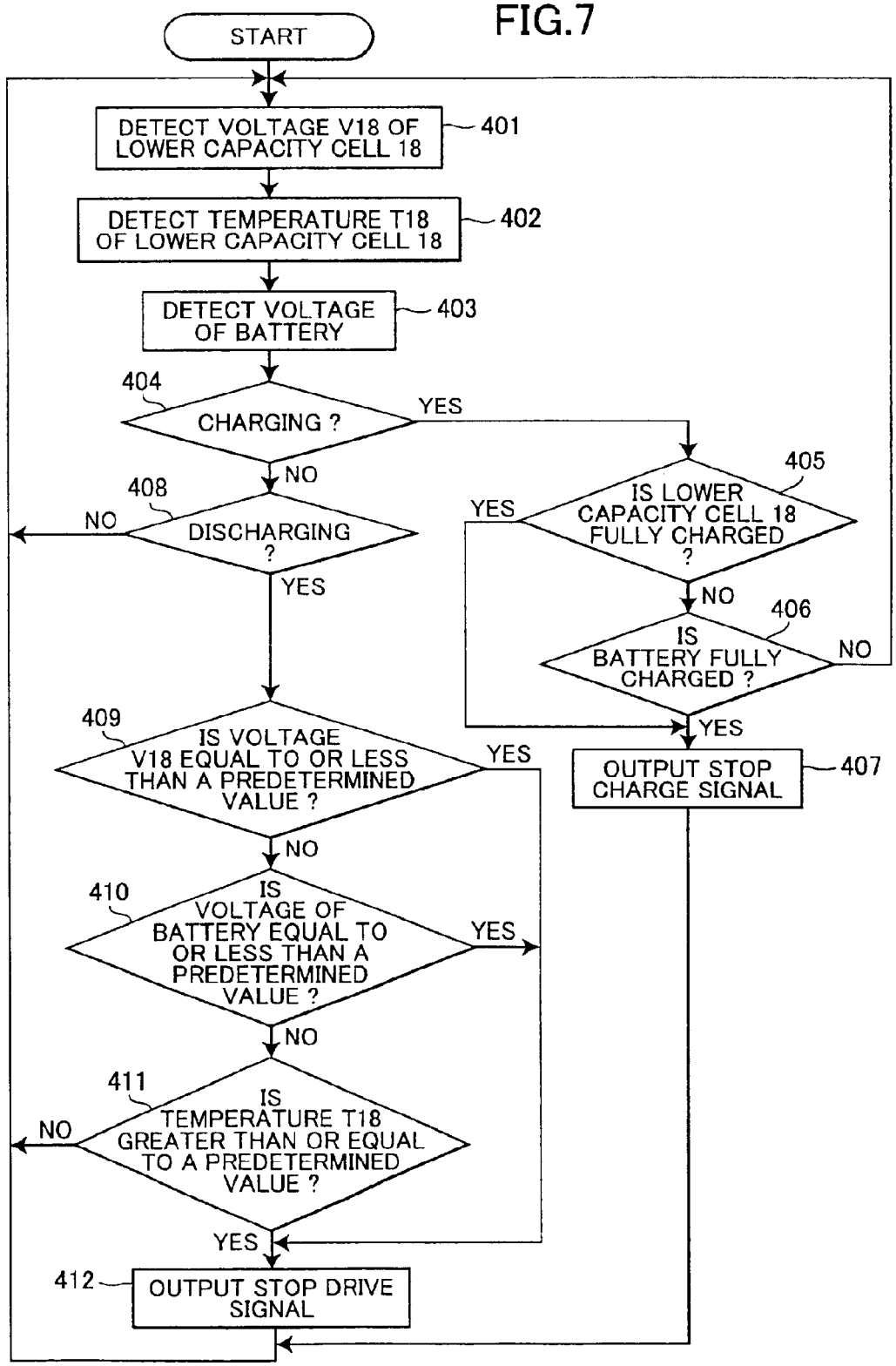
FIG. 7 is a flowchart representing a modification of operations shown in FIG. 6.

Next, a battery pack according to a modification of the embodiment will be described with reference to the flowchart of FIG. 7. When the program represented by the flowchart starts, in S401 and S402, the same processes as in S301 and S302 are performed. That is, the voltage V18 and the temperature T18 of the lower rated capacity cell 18 are detected.

Next, the A/D converter 65 converts the output of the battery voltage detector 40 into a digital signal that the CPU 61 uses to detect the voltage of the battery 10 (S403). Next, it is judged whether or not the battery pack 1 is presently being charged (S404) in the same manner as in S303 of the flowchart of FIG. 6. When the battery pack 1 is being charged (S404:YES), then it is judged whether or not the lower rated capacity cell 18 is fully charged (5405).

When it is judged that the lower rated capacity cell 18 is fully charged (S405:YES), or when the lower rated capacity cell 18 is not fully charged (S405:NO), but it is judged that the battery 10 is fully charged (S406:YES), then a stop charge signal for stopping the charging operation of the charging unit 100 is output from the output port 66 of the microcomputer 60 (S407). When the battery 10 is not fully charged (S406:NO), then the program returns to S401.

When the battery pack 1 is not presently being charged (S404:NO), then it is judged whether or not the battery 10 is discharging (S408). When the battery 10 is presently discharging (S408:YES), then it is judged whether or not the lower rated capacity cell 18 has discharged until the voltage V18 reached a predetermined voltage value or less (S409).

When the voltage V18 of the lower rated capacity cell 18 is not equal to or less than the predetermined voltage value (S409:NO), then it is judged whether or not the voltage of the battery 10 is equal to or less than a predetermined battery voltage value (S410). If the voltage of the battery 10 is not equal to or less than the predetermined battery voltage (S410:NO), then it is judged whether or not the temperature T18 of the lower rated capacity cell 18 is equal to or greater than a predetermined temperature value (S411). If the temperature T18 of the lower rated capacity cell 18 has not risen to the predetermined temperature value or greater (S411:NO), then the program proceeds to S401.

When the voltage V18 of the lower rated capacity cell 18 falls to less than or equal to the predetermined voltage value (S409:YES), when the voltage of the battery 10 is equal to or less than the predetermined battery voltage (S410:YES), or when the temperature T18 of the lower rated capacity cell 18 has risen to the predetermined temperature value or greater (S411:YES), then the stop drive signal for stopping drive of the portable device 200 is output from the output port 66 of the microcomputer 60 (S412). It should be noted that the predetermined voltage value that is compared with the voltage V18 of the lower rated capacity cell 18 and the predetermined battery voltage value that is compared with the voltage of the battery 10 are different values.

According to the modification, the entire battery is monitored in addition to the lower rated capacity cell with the low rated capacity. Charging is stopped at least one of these reaches a full charge. In addition, discharge is stopped when either of these is judged to be almost overcharged.

While the invention has been described in detail with reference to specific embodiments thereof, it would be apparent to those skilled in the art that various changes and modifications may be made therein without departing from the spirit of the invention, the scope of which is defined by the attached claims.

For example, the embodiment describes a single lower rated capacity cell as being incorporated in a plurality of cells. However, two or more lower rated capacity cells can be incorporated in accordance with the number of cells that make up the battery.

Also, the lower rated capacity cell 18 can be judged to be nearly over-discharged only when the voltage V18 of the lower rated capacity cell 18 is equal to or less than the predetermined voltage value (S307,409:YES) and also the temperature T18 of the lower rated capacity cell 18 has risen to greater than or equal to the predetermined temperature value (S308.411:YES).

What is claimed is:

1. A battery pack used as a power source for a portable device and chargeable by a charging unit, the battery pack comprising:

a battery including a plurality of cells connected in series, at least one of the plurality of cells being a lower rated capacity cell having a smaller capacity than another cells of the plurality of cells, the battery being selectively connectable to the portable device and the charging unit;

full charge judgment means for judging whether the lower rated capacity cell is fully charged; and control means for instructing the full charge judgment means to stop charging the battery when the full charge judgment means judges that the lower rated capacity cell is fully charged.

2. The battery pack according to claim 1, wherein the full charge judgment means comprises:

a cell temperature detector for detecting a temperature of the lower rated capacity cell and outputting a cell temperature signal indicative of the temperature of the lower rated capacity cell; and a cell voltage detector for detecting a voltage of the lower rated capacity cell and outputting a cell voltage signal indicative of the voltage of the lower rated capacity cell, wherein the full charge judgment means judges whether the lower rated capacity cell is fully charged based on the cell temperature signal and the cell voltage signal.

3. The battery pack according to claim 1, further comprising:

a battery voltage detector for detecting a voltage of the battery and outputting a battery voltage signal indicative of the voltage of the battery; and battery charge condition detection means for detecting an battery charge condition occurring in the battery during charging of the battery based on the battery voltage signal, wherein the control means instructs the full charge judgment means to stop charging the battery when the battery charge condition detection means detects the battery charge condition.

4. The battery pack according to claim 1, further comprising:

a battery voltage detector for detecting a voltage of the battery and outputting a battery voltage signal indicative of the voltage of the battery; and battery charge condition detection means for detecting an battery charge condition occurring in the battery during charging of the battery based on the battery voltage signal, wherein the control means instructs the full charge judgment means to stop charging the battery when the battery charge condition detection means detects the battery charge condition, wherein the full charge judgment means comprises:

a cell temperature detector for detecting a temperature of the lower rated capacity cell and outputting a cell temperature signal indicative of the temperature of the lower rated capacity cell; and a cell voltage detector for detecting a voltage of the lower rated capacity call and outputting a cell voltage signal indicative of the voltage of the lower rated capacity cell, wherein the full charge judgment means judges whether the lower rated capacity cell is fully charged based on the cell temperature signal and the cell voltage signal.

5. The battery pack according to claim 1, further comprising a charge/discharge detection unit for detecting whether the battery is presently charging or discharging.

6. The battery pack according to claim 1, wherein the lower rated capacity cell is disposed in a first of the plurality of cells from a negative terminal of the battery.

7. A battery pack used as a power source for a portable device and chargeable by a charging unit, the battery pack comprising:

a battery including a plurality of cells connected in series, at least one of the plurality of cells being a lower rated capacity cell having a smaller capacity than another cells of the plurality of cells, the battery being selectively connectable to the portable device and the charging unit;

abnormal cell discharge condition detection means for detecting an abnormal cell discharge condition occurring in the lower rated capacity cell during discharging of the lower rated capacity cell; and control means for instructing the portable device to stop driving the portable device when the abnormal cell discharge condition detection means detects the abnormal cell discharge condition.

8. The battery pack according to claim 7, wherein the abnormal cell discharge condition detection means comprises:

a cell temperature detector for detecting a temperature of the lower rated capacity cell and outputting a cell temperature signal indicative of the temperature of the lower rated capacity cell; and a cell voltage detector for detecting a voltage of the lower rated capacity cell and outputting a cell voltage signal indicative of the voltage of the lower rated capacity cell, wherein the abnormal cell discharge condition detection means judges whether the lower rated capacity cell is in the abnormal cell discharge condition based on at least one of the cell temperature signal and the cell voltage signal.

9. The battery pack according to claim 7, further comprising:

a battery voltage detector for detecting a voltage of the battery and outputting a battery voltage signal indicative of the voltage of the battery; and abnormal battery discharge condition detection means for detecting an abnormal battery discharge condition occurring in the battery during discharging of the battery based on the battery voltage signal, wherein the control means instructs the portable device to stop driving the portable device when the abnormal battery discharge condition detection means detects the abnormal battery discharge condition.

10. The battery pack according to claim 7, further comprising:

a battery voltage detector for detecting a voltage of the battery and outputting a battery voltage signal indicative of the voltage of the battery; and abnormal battery discharge condition detection means for detecting an abnormal battery discharge condition occurring in the battery during discharging of the battery based on the battery voltage signal, wherein the control means instructs the portable device to stop driving the portable device when the abnormal battery discharge condition detection means detects the abnormal battery discharge condition, wherein the abnormal cell discharge condition detection means comprises:

a cell temperature detector for detecting a temperature of the lower rated capacity cell and outputting a cell temperature signal indicative of the temperature of the lower rated capacity cell; and a cell voltage detector for detecting a voltage of the lower rated capacity cell and outputting a cell voltage signal indicative of the voltage of the lower rated capacity cell, wherein the abnormal cell discharge condition detection means judges whether the lower rated capacity cell is in the abnormal cell discharge condition based on at least one of the cell temperature signal and the cell voltage signal.

11. The battery pack according to claim 7, further comprising full charge judgment means for judging whether the lower rated capacity cell is fully charged, wherein the control means instructs the full charge judgment means to stop charging the battery when the full charge judgment means judges that the lower rated capacity cell is fully charged.

12. The battery pack according to claim 7, further comprising a charge/discharge detection unit for detecting whether the battery is presently charging or discharging.

13. The battery pack according to claim 7, wherein the lower rated capacity cell is disposed in a first step of the plurality of cells from a negative terminal of the battery.

* * * * *